July 10, 1962    J. A. PERRIN    3,043,946
ELECTRODE FOR CLEANING WELD SEAMS
Filed May 15, 1959
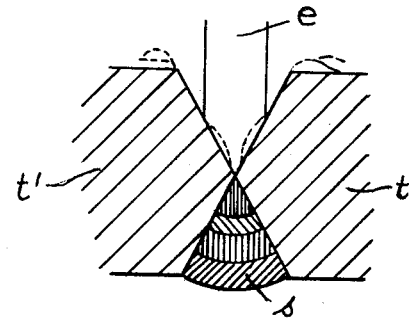
Fig.1
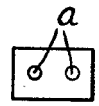 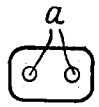 
Fig.2    Fig.3    Fig.4
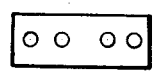 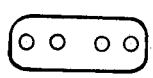 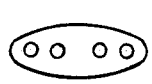
Fig.5    Fig.6    Fig.7
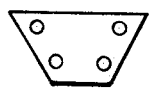 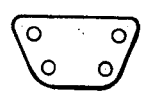 
Fig.8    Fig.9    Fig.10
*Inventor*
Jean Adrien Perrin
By
Stone & Mack
*Attorneys*

3,043,946
ELECTRODE FOR CLEANING WELD SEAMS
Jean Adrien Perrin, Pagny-sur-Moselle, France, assignor to Societe le Carbone-Lorraine, Paris, France, a French company
Filed May 15, 1959, Ser. No. 813,460
Claims priority, application France May 21, 1958
11 Claims. (Cl. 219—146)

In butt welding thick sheet metal plates together it is necessary to double chamfer the abutting edges of the sheets and then to deposit welding metal in seams on the two opposite faces. During the first weld on one face, the weld may be irregular, particularly in the groove bottom formed by the apices of the abutting chamfers, so that when the opposite face is being welded, blisters or inclusions of dross, which are harmful to the strength of the finished weld, may occur.

In order to avoid these drawbacks, after effecting the first weld it has been customary to clean the bottom of the opposite face groove by means of a compressed air chipper for example.

It is an object of the present invention to enable a cheap, simple, rapid, less noisy and more satisfactory cleaning operation to be effected by using an electrode having novel characteristics.

It is another object of the invention to provide an electrode suitable for this purpose.

Other objects and advantages will become apparent from a detailed study of the following description taken in conjunction with the accompanying drawings which show several embodiments of the electrode according thereto and in which:

FIGURE 1 shows a cross-section through a seam being welded and

FIGURES 2 to 10 show cross-sections through various embodiments of electrode.

Referring to FIGURE 1, $t$ and $t'$ show parts of two metal plates which are to be butt-welded together; each edge is double chamfered so that when the plates are placed together the chamfer apices touch to form upper and lower grooves to receive welding metal. The figure shows one seam $s$ already welded and $e$ represents the electrode for cleaning the empty groove opposite the seam $s$.

In making the chamfers, the edges are often burred over as shown in dotted lines at the upper part of the figure; the electrodes of the present invention may be used to remove such burrs.

The electrode $e$ consists of a carbon body extruded by means of an extruding press, and having a flattened shape and comprising an even number of channels filled with a highly ionising paste.

A first advantage of the invention is to enable the cleaning work to be effected by means of the same electric supply used for making the weld seams. Thus it is no longer necessary to take special apparatus to the place of work and this thus results in a simplification of the equipment.

A second advantage is due to the fact that the cleaning work may be carried out whilst using either an A.C. or a D.C. supply. This constitutes a very important advantage over other cleaning processes used hitherto which employed cylindrical carbon or graphite electrodes having a D.C. supply feed. It was not possible with these electrodes to carry out the operation properly by means of an A.C. supply.

Another characteristic advantage of the invention is that it enables a groove bottom having the same angle as the chamfers of the sheet metal plates to be effected and enables a defective weld or an irregularity of metal to be cleaned up.

The carbon body of the electrode is constituted by a paste composed of amorphous carbon, coke or artificial graphite provided separately or in mixture. The materials are bound by tar or resin and the extruded electrode is then baked at high temperature by the usual means. The electrode thus prepared and baked may be subsequently graphited by any known means. The graphitisation of the electrode may also be effected directly on the basis of the same components provided separately or in a mixture in the crude state. The electrode thus made is able to withstand the high temperatures required for melting metals whilst preserving an excellent mechanical resistance.

The cross section of the electrode may be rectangular with sharp angles as shown in FIGURES 2 and 5, or rectangular with rounded angles as shown in FIGURES 3 and 6; it may also have an elliptical shape as shown in FIGURES 4 and 7, or it may be trapezoidal with sharp angles (FIGURE 8) or trapezoidal with rounded angles (FIGURE 9); it may alternatively have the shape of a hollow gouge (FIGURE 10) or any other shape suitable for special welding operations.

The electrode of whatever shape, is provided with an even number of bores or channels $a$, which bores or channels are symmetrical and parallel to the axis of the electrode. They are thus in a position enabling a sufficient ionisation of the arc as well as a maintenance, at a high temperature, of the intermediate carbon part. According to their number, the channels may be located in median positions, as in FIGURES 2, 3, or 4 or be distributed towards the external edges and along the greatest dimension in the case of the flattened forms, as seen in FIGURES 5, 6, or 7, or be distributed towards the non-parallel edges in the case of the trapezoidal forms as shown in FIGURES 8 or 9, or be distributed towards the external edges in the case of the hollow gouge form shown in FIGURE 10.

The bores or channels $a$ are filled with a paste constituted by silicon or siliceous compounds, alkaline materials or alkaline compounds, provided separately or mixed with a carbon material, all these components being bound by means of a suitable binder. The active part of this core paste may vary by weight from 20 to 50% and the carbon part may vary from 50 to 80% by weight.

The cores may be injected and then baked in any suitable manner, or they may be introduced in the crude state in channels provided for this purpose.

By way of non-limiting example, the composition of an electrode body will be given and thereafter the composition of a corresponding core paste which has yielded particularly satisfactory results.

The body of the electrode in this example is constituted by a mixture of 10% amorphous carbon, 30% coke and 60% artificial graphite to which is added a sufficient amount of binder in order to bond the materials and to enable the electrode to be extruded in the shape of a crude electrode, which is then baked at a high temperature. The paste injected in the bores or channels of the electrode comprises 18% silicon, 12% potassium carbonate and 70% carbon. An amount of binder is added to this mixture sufficient to bind it together.

It will be understood that all these figures refer to proportions by weight.

The dimensions of the electrodes may vary within rather wide limits in accordance with the special applications for which they are intended. However they are generally chosen in such a manner that the ratio of the major dimension of the cross section to the minor dimension varies from 1.5 to 2.5.

The distance between the axes of two median or neighbouring bores or channels is at least equal to $9/10$ of the minor dimension of the cross section. The mean diameter of these bores or channels is at most equal to 3/10 of the minor dimension of the cross section.

The electrode may also be covered, before or after baking at a high temperature, or before or after graphitisation, with a silica coating or with a coating of silico-alkaline or silico-metallic compounds in order to render it more resistant to superficial oxidation which may occur at a high temperature through the oxygen present in the ambient atmosphere. This coating causes the formation of refractory carbides on the surface of the electrode and thus protects it from oxidisation at a high temperature.

In accordance with the conditions required for specific applications, the electrode may also be coated with an adhesive metallic deposit, such as copper, in order to ensure a good electric connection and a good metal-carbon heat transfer. Metallising may be effected by any known processes: such as electro-plating, the Schoop process and in particular by making deep and continuous marks on the outside of the carbons during the extruding process. The electrodes in accordance with the invention may thus have surfaces provided with grooves or any other relief shapes able to enhance the creation of a metallic coating adhering to the surface which may or may not be coated with siliceous compounds.

The electrodes according to the invention may be applied generally to all auxiliary operations of welding: Gouging, desealing, finishing off, levelling, cutting out etc. They may be employed with benefit for operations other than cleaning up groove bottoms and in particular when it is required to do over a deflective weld seam. It is then possible with these electrodes to hollow out a groove having the shape desired in order to reach the defective region and to enable a new weld seam to be applied. In other conditions these same electrodes, preferably those having a shape corresponding to FIGURES 2 to 7, enable a levelling of the weld seams holding the sheet metal plates or of the "canapes" which were employed for assembling the parts to be welded. The invention can also be applied to the levelling of weld seams having protruberances, and cutting sheet metal plates to the desired size at the place where they are located. Other applications of the invention are easily envisaged.

I claim:

1. An electrode for cleaning weld seams, consisting of a base member of carbon having an elongated cross-section and being longitudinally bored in an even number of places symmetrically located with respect to the longitudinal axis of the base member, and a highly ionising paste filled in said bores.

2. An electrode for cleaning weld seams, consisting of a base member of carbon having an elongated rectangular cross-section and longitudinally bored in an even number of places symmetrically located with respect to the longitudinal axis of the base member, said bores being adjacent the shorter outer edges of the elongated section and being filled with a highly ionising paste.

3. An electrode for cleaning weld seams, consisting of an oval-section base member of carbon longitudinally bored in an even number of places symmetrically located with respect to the longitudinal axis of the base member, said bores being also located in the major axis of the oval and on opposite sides of the minor axis thereof and being filled with a highly ionising paste.

4. An electrode for cleaning weld seams, consisting of a trapezium-section base member of carbon longitudinally bored in an even number of places symmetrically located with respect to the longitudinal axis of the base member, said bores being adjacent the non-parallel edges of said trapezium section and being filled with a highly ionising paste.

5. An electrode for cleaning weld seams, consisting of a carbon base longitudinally bored in an even number of places symmetrically located with respect to the longitudinal axis of the base member, said bores being filled with a paste consisting of 20% to 50% siliceous material and 80% to 50% carbonaceous material.

6. An electrode for cleaning weld seams, consisting of a base member comprising 10% amorphous carbon, 30% coke and 60% artificial graphite, said base member being bored longitudinally in an even number of places symmetrically located with respect to the longitudinal axis of the base member, and said bores being filled with a paste comprising 18% silicon, 12% potassium carbonate and 70% carbon.

7. An electrode for cleaning weld seams, consisting of a base member of carbon having an elongated cross-section and being longitudinally bored in an even number of places symmetrically located with respect to the longitudinal axis of the base member, the distance between any two of said bores being greater than 3/10 of the small dimension of the section of said base member, and said bores being filled with a highly ionising paste.

8. An electrode for cleaning weld seams, consisting of a base member of carbon having an elongated cross-section and longitudinally bored in an even number of places symmetrically located with respect to the longitudinal axis of the base member, said electrode having one end V-shaped with the apex of the V extending along the minior axis of the section between the bores, and said bores being filled with a highly ionising paste.

9. An electrode as claimed in claim 1, wherein the outer side surfaces of the carbon base member are coated with a metallic deposit.

10. An electrode as claimed in claim 1 wherein the outer side surfaces of the carbon base member are coated with a siliceous compound.

11. An electrode as claimed in claim 10, wherein said siliceous coating is covered with a coating of a metallic deposit.

References Cited in the file of this patent

UNITED STATES PATENTS

| | | |
|---|---|---|
| 1,321,309 | Holslag | Nov. 11, 1919 |
| 1,322,491 | King | Nov. 18, 1919 |
| 1,444,962 | Eynon | Feb. 13, 1923 |
| 1,451,392 | Holslag | Apr. 10, 1923 |
| 1,891,546 | Krembs | Dec. 20, 1932 |
| 2,586,516 | Cobine | Feb. 19, 1952 |
| 2,694,764 | Muller | Nov. 16, 1954 |